United States Patent
Gonzalez et al.

(10) Patent No.: US 12,428,161 B2
(45) Date of Patent: Sep. 30, 2025

(54) FORCE ABSORBING SHOULDER BELT ASSEMBLIES ESPECIALLY USEFUL FOR AIRCRAFT OCCUPANT SEATS

(71) Applicant: Textron Aviation Inc., Wichita, KS (US)

(72) Inventors: Dean Ross Gonzalez, Wichita, KS (US); Sean Ormerod, Wichita, KS (US)

(73) Assignee: TEXTRON INNOVATIONS INC., Providence, RI (US)

( * ) Notice: Subject to any disclaimer, the term of this patent is extended or adjusted under 35 U.S.C. 154(b) by 171 days.

(21) Appl. No.: 18/472,126

(22) Filed: Sep. 21, 2023

(65) Prior Publication Data
US 2025/0100689 A1    Mar. 27, 2025

(51) Int. Cl.
*B60R 22/28* (2006.01)
*B64D 11/06* (2006.01)

(52) U.S. Cl.
CPC ............ *B64D 11/062* (2014.12); *B60R 22/28* (2013.01)

(58) Field of Classification Search
CPC . B64D 11/062; B60R 22/28; B60R 2022/283; B60R 2022/286
See application file for complete search history.

(56) References Cited

U.S. PATENT DOCUMENTS

| | | | |
|---|---|---|---|
| 2,622,664 A | 12/1952 | Koehler | |
| 3,694,028 A * | 9/1972 | Andres | B60R 22/28 188/374 |
| 3,765,700 A | 10/1973 | Littmann | |
| 4,627,639 A | 12/1986 | Sedlmayr | |
| 5,211,694 A | 5/1993 | Sakakida | |
| 5,544,918 A | 8/1996 | Fleming | |
| 5,566,978 A | 10/1996 | Fleming | |
| 5,700,034 A | 12/1997 | Lane, Jr. | |
| 5,700,545 A | 12/1997 | Audi et al. | |
| 5,799,760 A | 9/1998 | Small | |

(Continued)

FOREIGN PATENT DOCUMENTS

CN      107672554      2/2018

*Primary Examiner* — Philip F Gabler
(74) *Attorney, Agent, or Firm* — Nixon & Vanderhye, P.C.

(57) ABSTRACT

Force absorbing shoulder belt assemblies for vehicle seats (e.g., aircraft seats) absorb and thereby reduce shoulder belt forces on the upper torso of a seat occupant in the event of a rapid deceleration event (e.g., a vehicle crash). A one-piece base mounting plate is provided which includes a central base plate section, a forwardly bent section and a forwardly projecting section extending from the forwardly bent section subjacent to the central base plate section. A pair of aligned perforations formed through the central base plate section laterally adjacent to the forwardly projecting section may be provided. The exertion of a deceleration force of predetermined magnitude on the shoulder web strap of an inertial reel attached to the forwardly projecting section along a force vector will cause a shear pin bolt normally connecting the central base plate section to the subjacent forwardly projecting section to shear thereby separating the latter from the former which in turn causes the forwardly bent portion to unbend in a direction of the force vector and/or to tear the central base plate section along the aligned perforations thereby absorbing at least a portion of the deceleration force.

18 Claims, 10 Drawing Sheets

(56) References Cited

U.S. PATENT DOCUMENTS

| | | | | |
|---|---|---|---|---|
| 6,068,664 | A * | 5/2000 | Meyer | B60R 22/1952 |
| | | | | 297/480 |
| 6,336,664 | B1 | 1/2002 | Roder | |
| 6,561,580 | B1 | 5/2003 | Bergey | |
| 6,736,427 | B2 | 5/2004 | Herrmann | |
| 6,913,288 | B2 * | 7/2005 | Schulz | B60R 22/28 |
| | | | | 280/808 |
| 10,442,393 | B2 * | 10/2019 | Jaradi | A44B 11/2553 |
| 2005/0012319 | A1 * | 1/2005 | Schulz | B60R 22/28 |
| | | | | 280/808 |
| 2008/0303325 | A1 * | 12/2008 | Scholz | B60N 2/2806 |
| | | | | 297/250.1 |
| 2010/0109395 | A1 | 5/2010 | Ruthinowski | |
| 2017/0267208 | A1 | 9/2017 | Marriott | |
| 2019/0071059 | A1 | 3/2019 | Besier | |
| 2019/0202397 | A1 | 7/2019 | Jaradi | |
| 2025/0100690 | A1 * | 3/2025 | Gonzalez | B64D 11/062 |

* cited by examiner

FORCE ABSORBING SHOULDER BELT ASSEMBLIES ESPECIALLY USEFUL FOR AIRCRAFT OCCUPANT SEATS

FIELD

The embodiments disclosed herein relate generally to force absorbing shoulder belt assemblies for vehicle occupant seats, especially aircraft occupant seats. The assemblies disclosed herein may however also find utility in occupant seats employed in the related fields of automotive, rail, and machinery industries.

BACKGROUND

Conventional shoulder belts (especially shoulder belts associated operatively with inertial reels) are well known safety devices used in a variety of vehicles, including aircraft, in combination with conventional lap belts. The use of shoulder belts will thus prevent sudden and large deceleration forces from propelling the seat occupant forwardly thereby minimizing if not preventing injury due to the occupant being dislodged from the seat and/or striking structures located forwardly adjacent to the seat (e.g., instrument panels, forwardly adjacent seat structures, interior aircraft monuments and the like).

While seat belts are important safety features for vehicle seats, they are typically inelastic and thus large deceleration forces can be transferred by the shoulder belt to the occupant's body. If the deceleration force is sufficiently high, therefore, the occupant's body, especially the occupant's torso region, could be injured by the shoulder belt itself. This possibility is especially critical for aircraft seats which must meet certain certification criteria by governmental authorities with regard to the maximum allowable deceleration forces (colloquially called "g-forces" which are a multiple of the standard gravitational force). For this reason, several energy absorbing systems have been proposed such as those described in U.S. Pat. Nos. 4,060,278, 5,700,545 and 6,561,580 (the entire contents of each being expressly incorporated hereinto by reference).

Although there have been prior proposals to provide energy absorbing systems for shoulder belts and/or occupant seats, there is a continued need for improvements. It is towards providing such improvements that the embodiments disclosed herein are directed.

SUMMARY

In general the embodiments disclosed herein are directed toward shoulder belt assemblies for vehicle seats (e.g., aircraft seats) which absorb and thereby reduce shoulder belt forces on the upper torso of a seat occupant in the event of a rapid deceleration event (e.g., a vehicle crash). According to certain embodiments, the force absorbing shoulder belt assembly will include a one-piece base mounting plate adapted to be attached to adjacent vehicle structure, the one-piece base mounting plate including a central base plate section, a forwardly bent section (which may have a generally triangular cross-sectional configuration) at a rear portion of the central base plate section, and a forwardly projecting section extending from the forwardly bent section subjacent to the central base plate section. An inertial reel assembly is attached to the forwardly projecting section of the one-piece mounting plate and includes a shoulder web strap which in use is adapted to being positioned adjacent to a torso region of an occupant of the vehicle seat. A shear pin bolt connects a forward end of the forwardly projecting section to the central base section. When a deceleration force of predetermined magnitude is exerted on the shoulder web strap along a force vector, the shear pin bolt will shear thereby separating the forwardly projecting section from the central base plate section which in turn causes the forwardly bent portion to unbend in a direction of the force vector thereby absorbing at least a portion of the deceleration force.

According to some embodiments, the force absorbing shoulder belt assembly may include, alternatively or additionally to the forwardly bent section, a pair of aligned perforations formed through the central base plate section laterally adjacent to the forwardly projecting section. The central base plate section is therefore allowed to tear along the pair of aligned perforations in response to the deceleration force of predetermined magnitude thereby absorbing at least a portion of the deceleration force. Such embodiments may include a pair of reentrant concavities adjacent the forwardly bent section at a rear edge of the central base plate section and operatively associated with a respective one of the aligned perforations. The reentrant concavities will therefore provide incipient tear points of the central plate section for the aligned perforations. The central base plate section may also include respective openings forwardly of the aligned perforations, the openings having a diameter larger than diameters of the aligned perforations so as to stop forward tearing of the central base plate therealong.

The central base plate section according to some embodiments will define a plurality of elongate apertures which are sized and configured to accept therein the nuts associated with a set of bolt and nut assemblies attaching the inertial reel assembly to the forwardly projecting section of the one-piece base mounting plate. The nut and bolt assemblies may be provided so as to attach a mounting bracket of the inertial reel assembly to the forwardly projecting section. The nuts will therefore be pulled downwardly and forwardly in response to the shear bolt being sheared.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
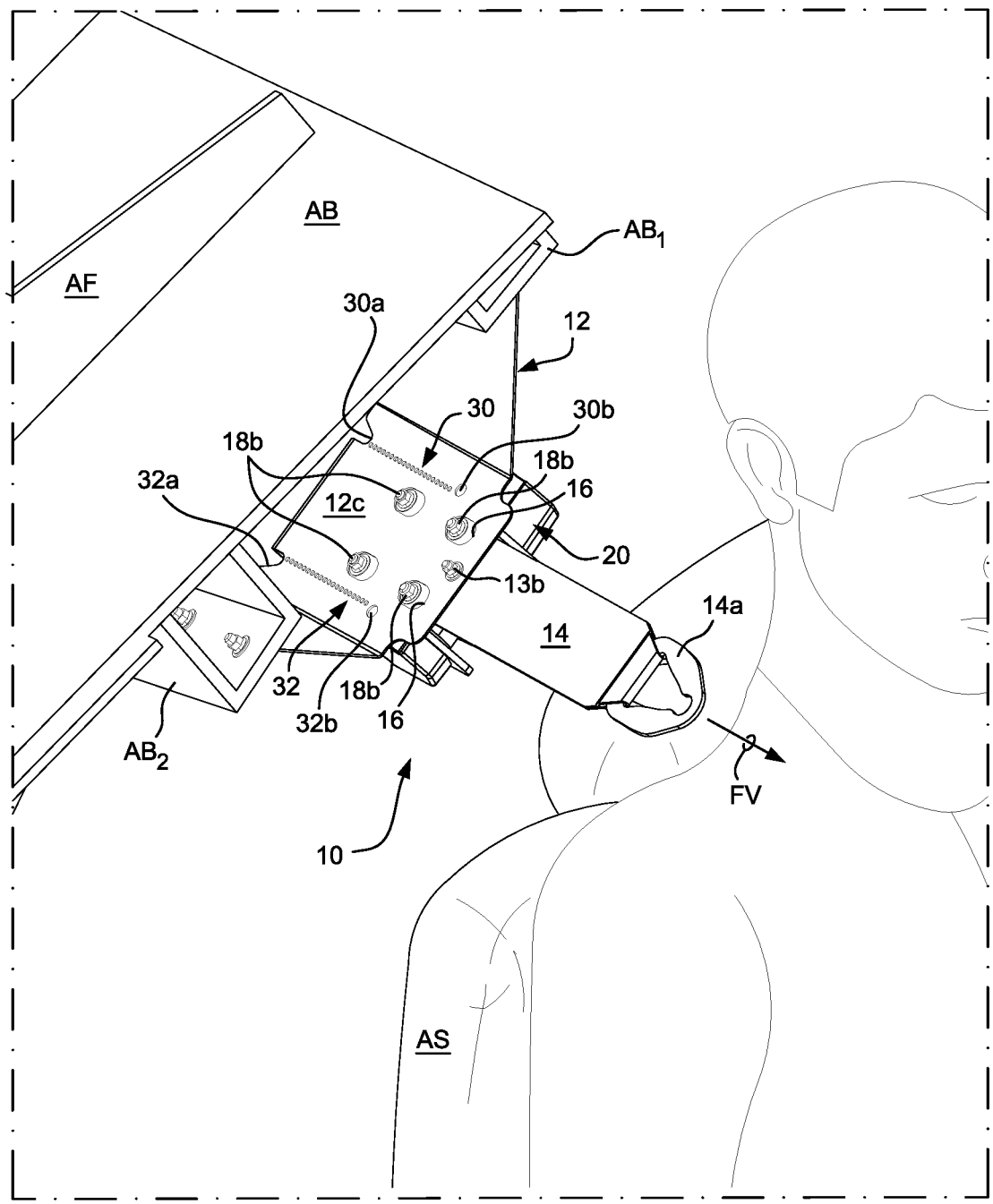
FIG. 1 is a front perspective environmental view showing an energy absorbing shoulder belt assembly in accordance with an embodiment of this invention in operative association with an aircraft occupant seat.
Figure 2:
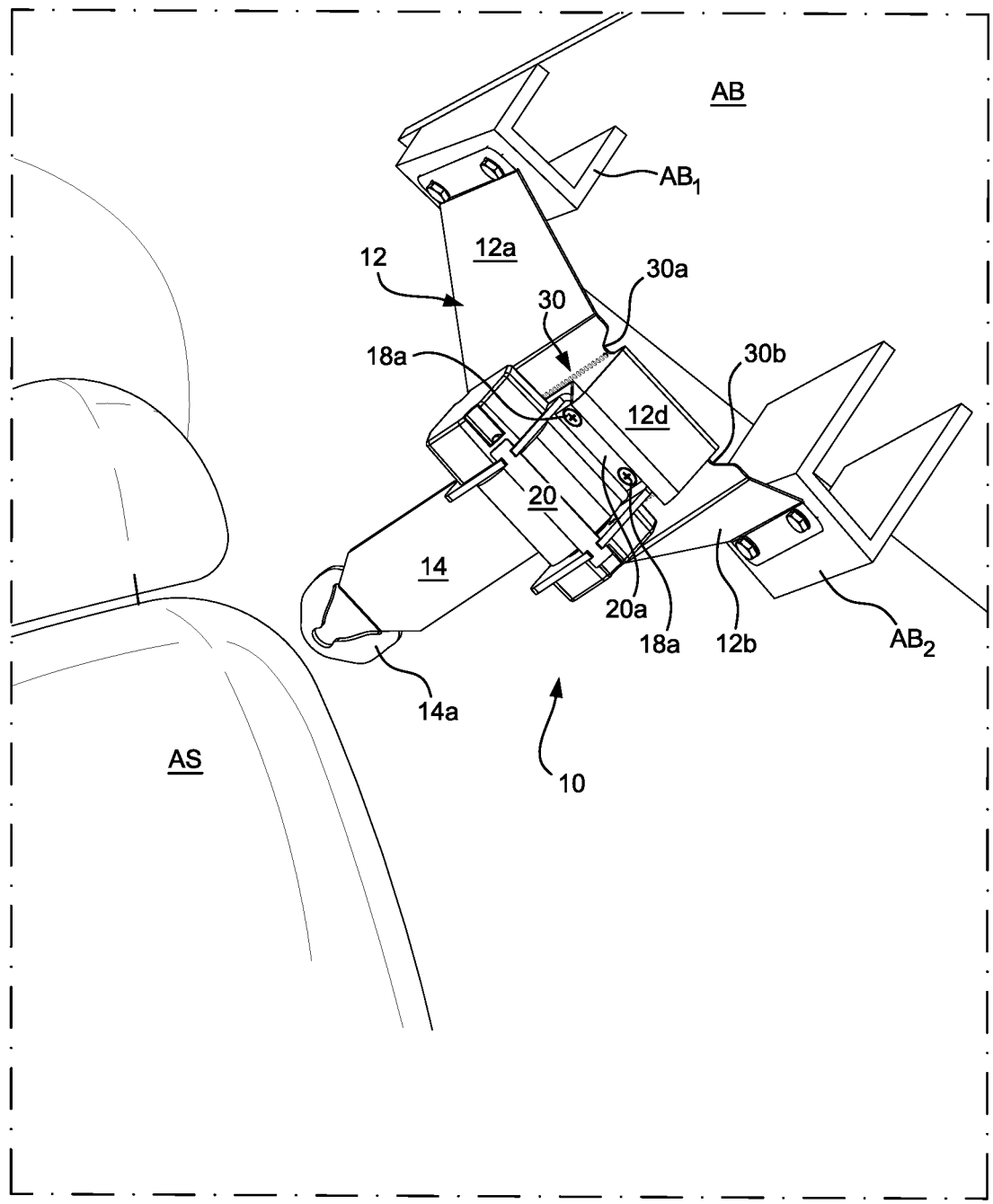
FIG. 2 is a rear perspective environmental view thereof.
Figure 3:
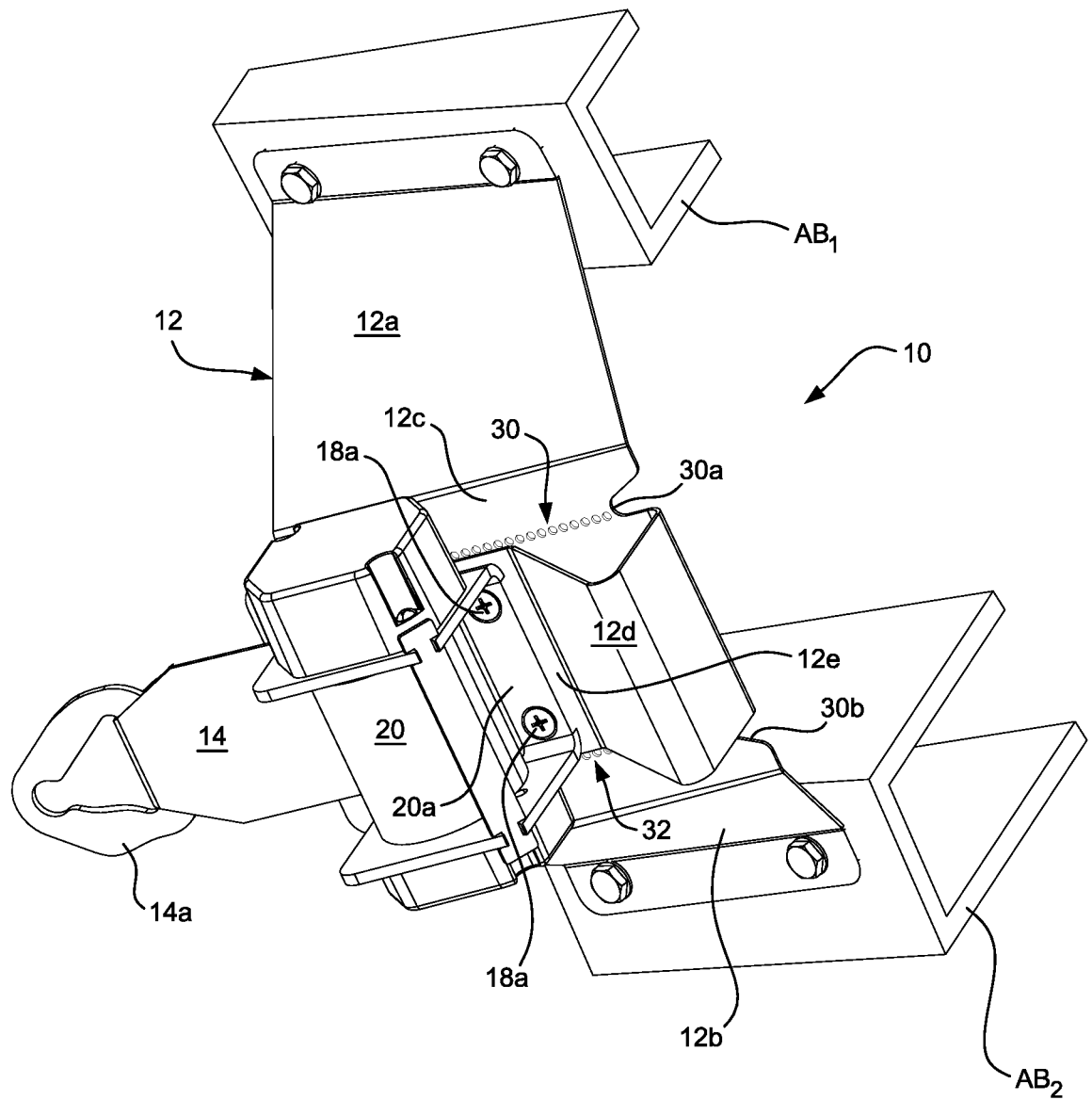
FIG. 3 is a bottom rear perspective view of the energy absorbing shoulder belt assembly depicted in FIGS. 1 and 2, respectively.
Figure 4:
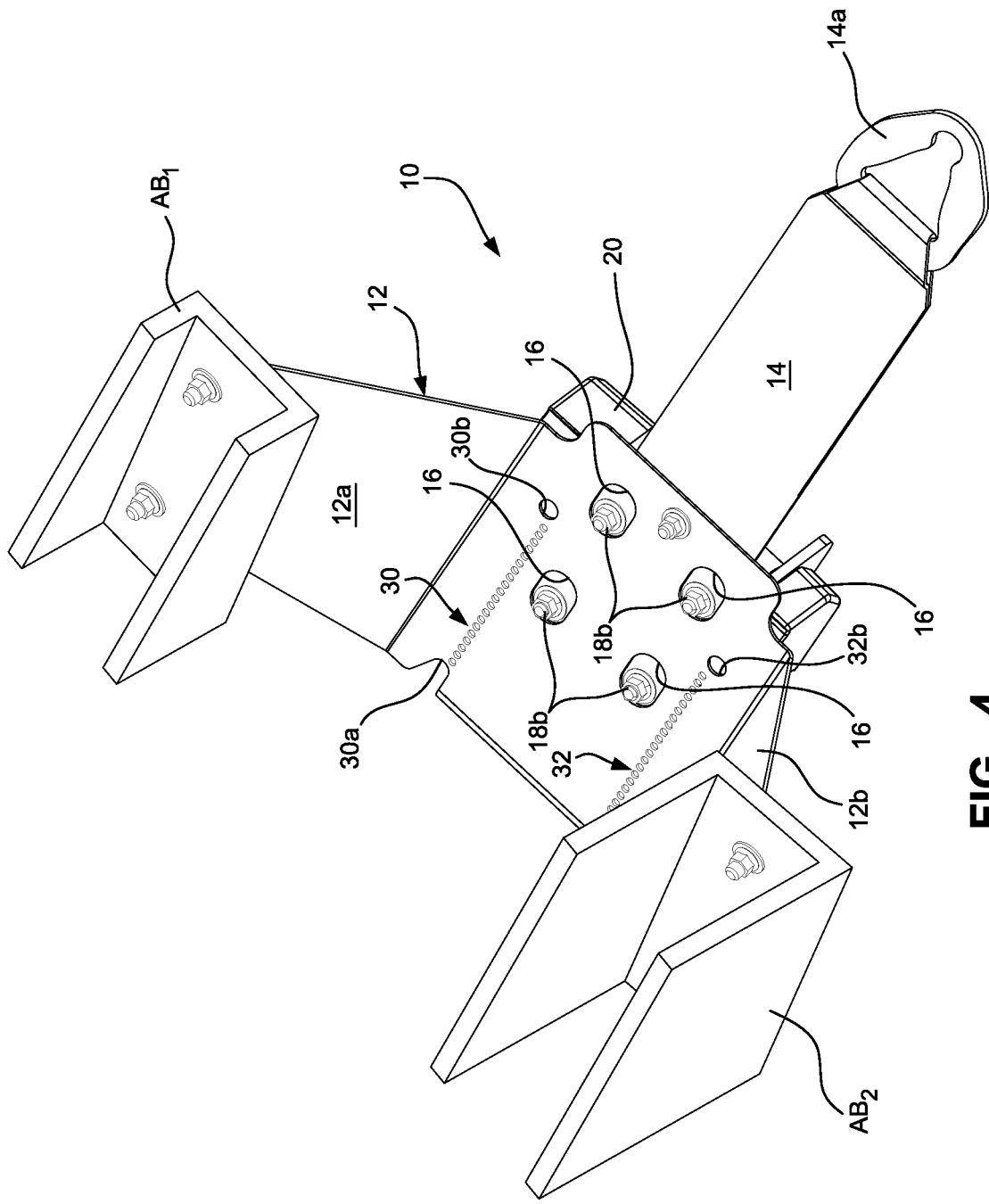
FIG. 4 is a top front perspective view thereof.
Figure 5:
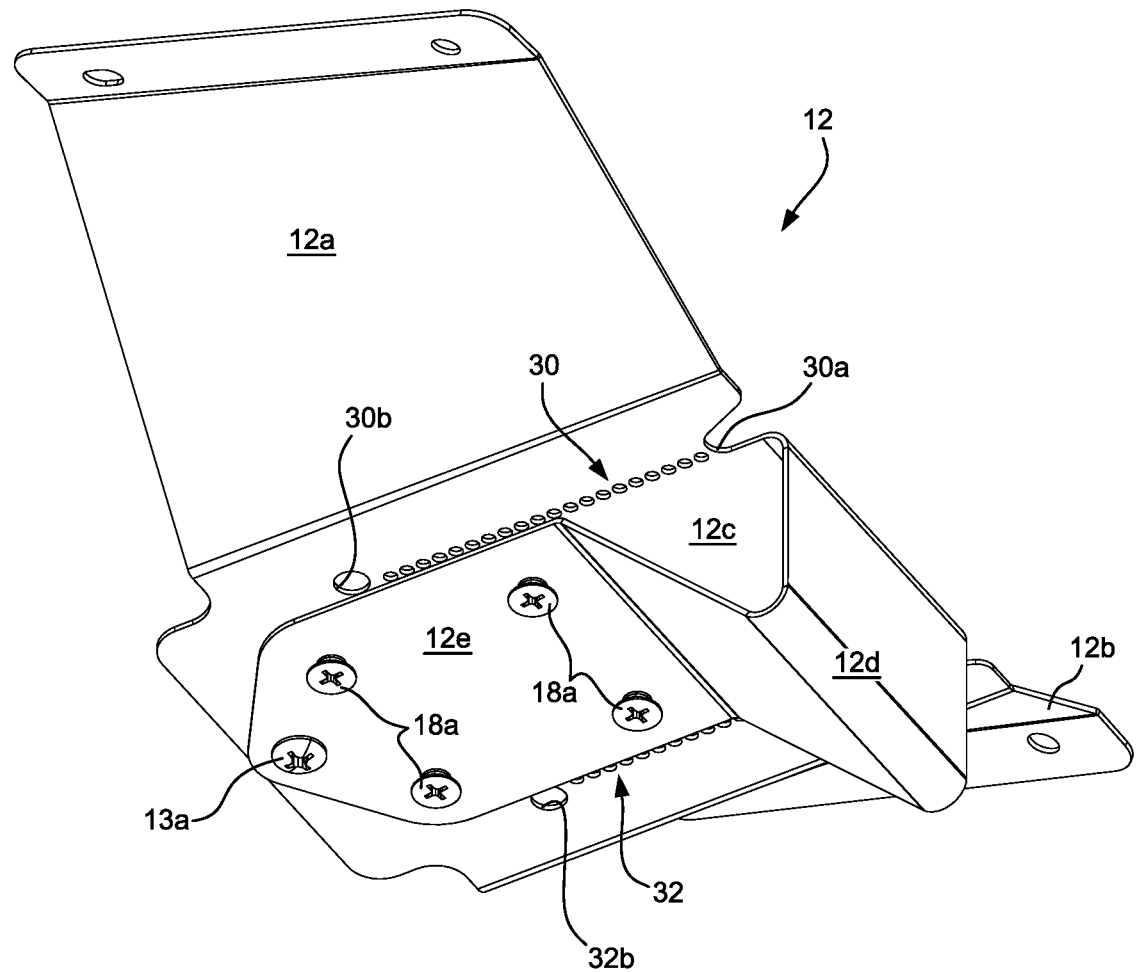
FIG. 5 is bottom rear perspective view of the one-piece (unitary) base mounting plate employed in the energy absorbing should belt assembly.
Figure 6:
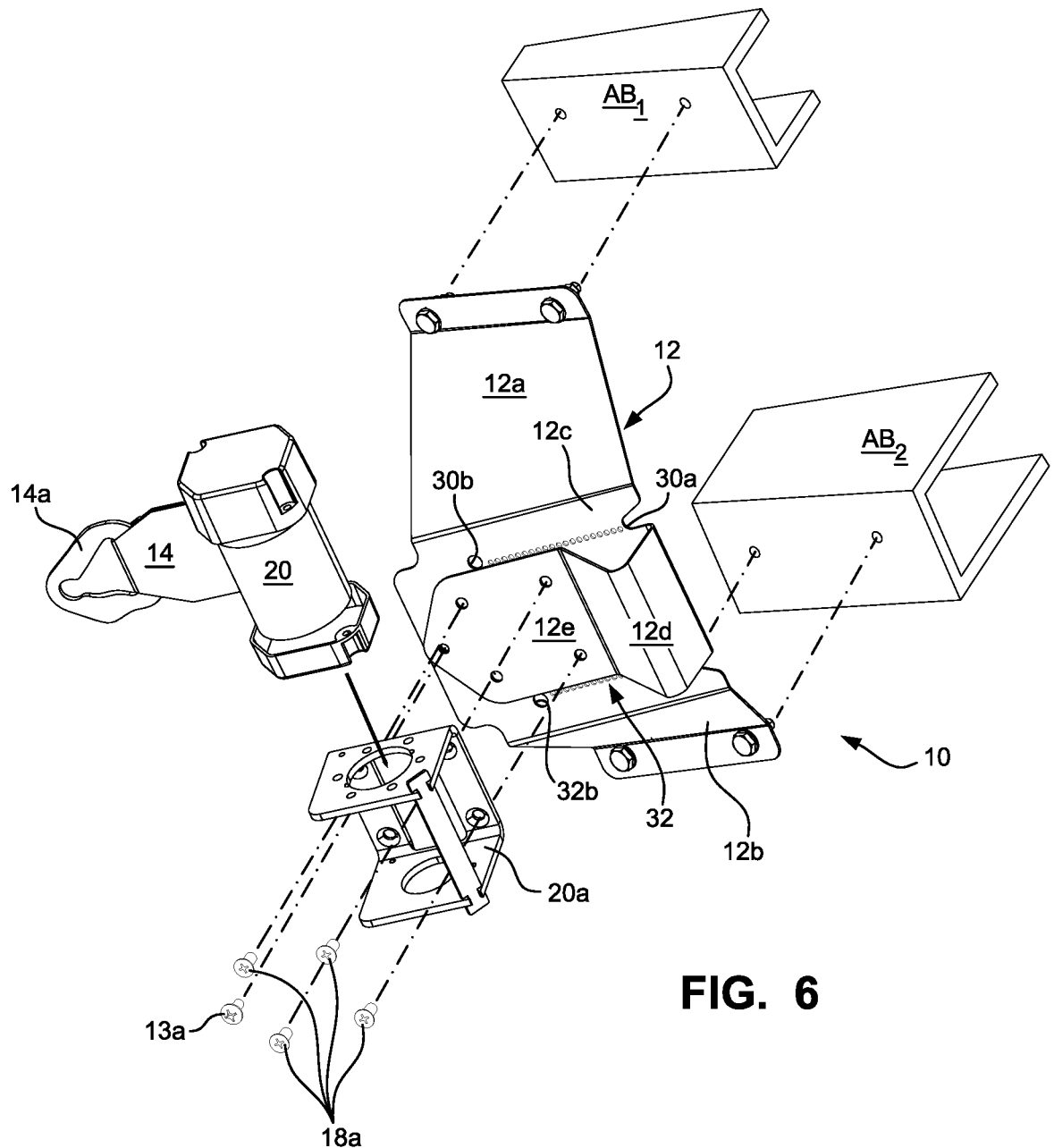
FIG. 6 is a bottom rear perspective exploded view of the structural components comprising energy absorbing shoulder belt assembly depicted in FIGS. 3 and 4.
Figure 7:
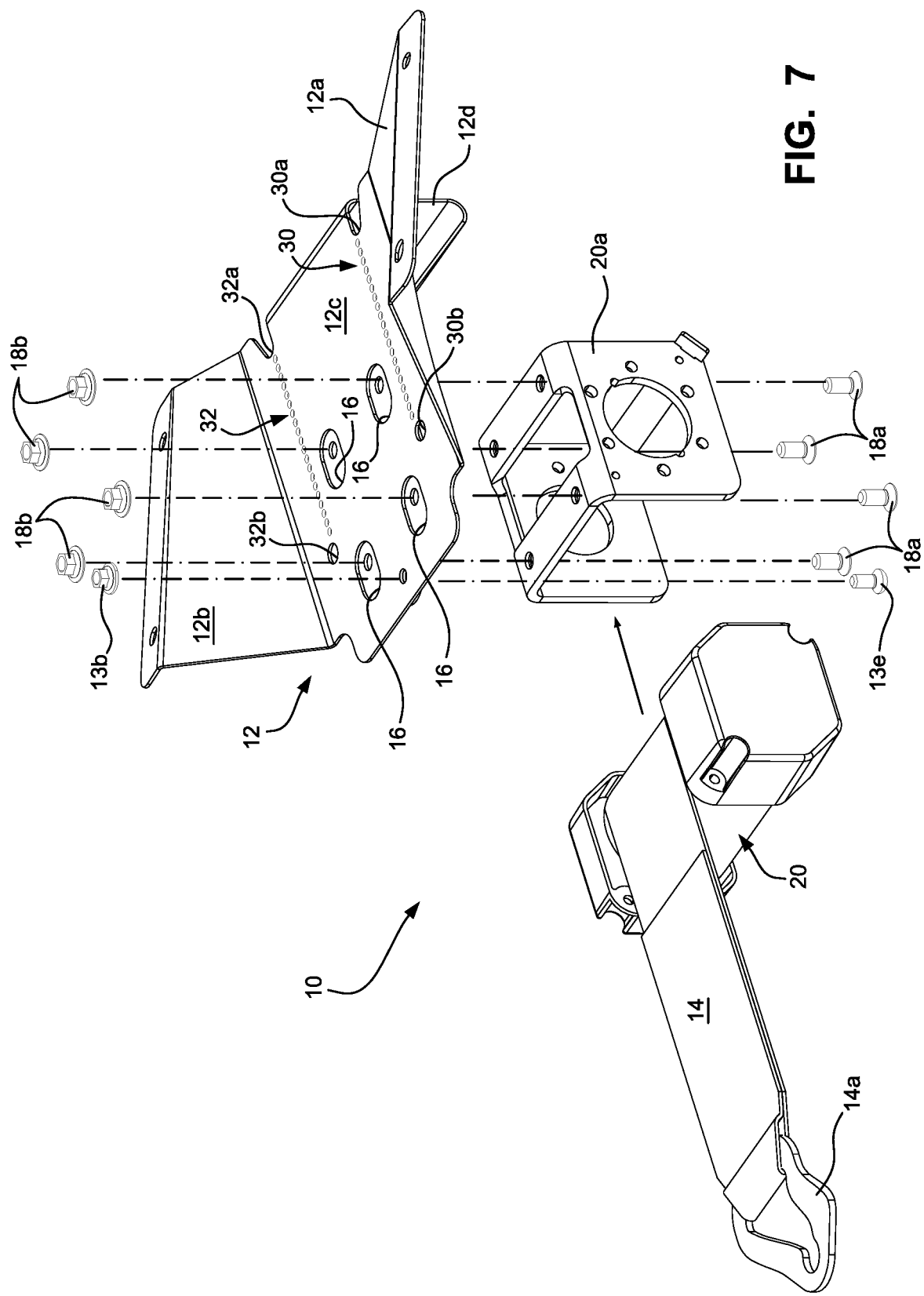
FIG. 7 is a top front perspective exploded view thereof.

As is shown in FIGS. 1-2, an exemplary aircraft occupant seat AS is provided with an energy absorbing shoulder belt assembly 10 in accordance with an embodiment of this invention which is immovably attached to adjacent aircraft fuselage structure AF by an airframe bracket AB. The airframe bracket AB will preferably include an upper inboard mounting bracket AB1 and a lower outboard mounting bracket AB2 to which a one-piece (unitary) base mounting plate 12 of the belt assembly formed of a suitably strong metal (e.g., stainless steel) is rigidly attached by inboard and outboard mounting flanges 12a, 12b, respectively. The inboard and outboard mounting brackets AB1, AB2 and mounting flanges 12a, 12b, respectively, are configured so that the plane of the central base plate section 12c is angularly skewed downwardly inboard relative to a vertical plane parallel to the aircraft's longitudinal axis. Such an angular skew of the central base plate section 12c will in turn position the shoulder belt assembly 10 so that the shoulder web strap 14 in use extends across the seat occupant's torso region in substantial alignment with a force vector FV of the anticipated deceleration forces acting thereon. Such alignment of the shoulder web strap 14 and the force vector FV will ensure that anticipated deceleration forces will be exerted substantially entirely through the shoulder web belt 14 to the shoulder belt assembly 10 so it can perform its force absorbing function to be described hereinbelow.

It will of course be understood that although the shoulder belt assembly 10 is shown and discussed herein as being positioned so that the shoulder web belt 14 extends over and across a seat occupant's upper right shoulder and crosses the seat occupant's torso diagonally to the seat occupant's lower left waist area where the end connection buckle 14a can be connected to a waist seat belt buckle (not shown), the structures discussed and shown herein could also be configured so that the shoulder belt assembly 10 is positioned in a substantial mirror image so that the shoulder web strap 14 extends over and across the seat occupant's left shoulder and then diagonally across the seat occupant's torso to the lower right waist area.

As is perhaps best shown in FIGS. 3-7, a rearward portion of the central base plate section 12c includes a forwardly bent section 12d of predetermined geometric configuration which terminates in a unitary forwardly projecting section 12e that is subjacent to and in contact with the central base plate section 12c. The forward end of the forwardly projecting section 12e is connected to the central base plate section 12c by a shear pin bolt 13a and an associated nut 13b. The shear pin bolt 13a is selectively sized so as to shear in response to a predetermined minimum shear force (e.g., a minimum shear force sufficient to meet design criteria).

The central base plate section 12c also defines a series of elongate openings 16 oriented substantially in alignment with the force vector FV. The elongate openings 16 are sized and configured to accept therewithin the attachment nuts 18b which are threadably connected to respective ones of the attachment bolts 18a serving to couple the mounting frame 20a of the inertial reel assembly 20 to the forwardly projecting section 12e. A linear pair of aligned perforations 30, 32 are formed in the central base plate section 12c laterally adjacent to the forwardly projecting section 12e. Each pair of aligned perforations 30, 32 extends from a rear reentrant concavity 30a, 32a to a forward opening 30b, 32b, respectively. Each of the forward openings 30b, 32b have a diameter that is substantially (e.g., at least 3 times) greater than the diameters of the individual perforations 30, 32.

Figure 8:
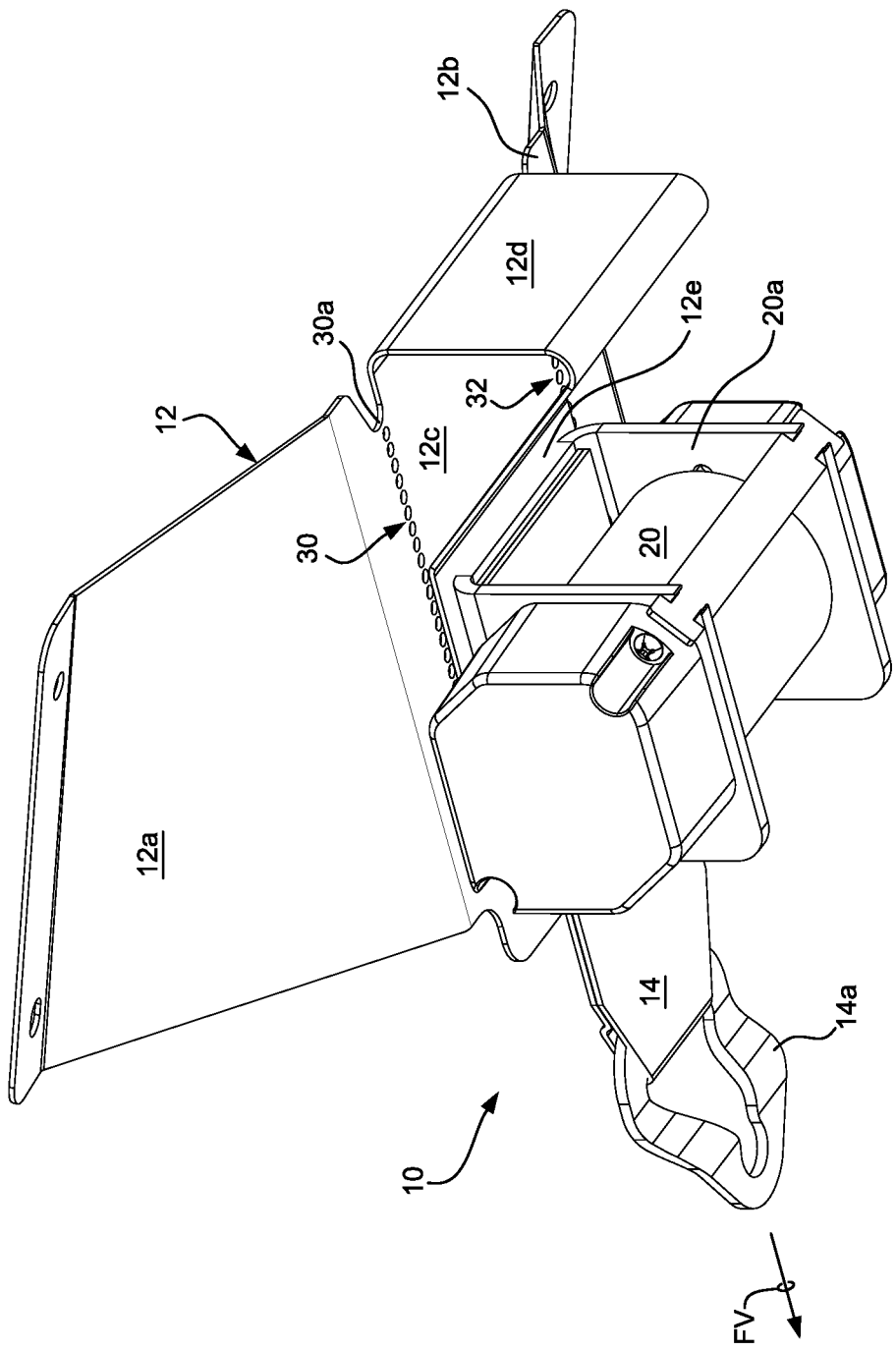
FIGS. 8-10 are sequential bottom rear perspective views showing the operation of the energy absorbing shoulder belt assembly in response to a deceleration force exceeding a design threshold.

In use during normal operational events as shown in FIG. 8, the occupant of the aircraft seat AS may extend the shoulder web strap 14 over the seat occupant's shoulder and then diagonally across the seat occupant's torso where the end connection buckle 14a can be connected to a waist seat belt buckle (not shown) as previously discussed without interference of any structure associated with the shoulder belt assembly 10. Thus, during normal operational use, the occupant is allowed to lean forwardly in the aircraft seat AS causing the shoulder web strap 14 to be paid out from the inertial reel assembly 20 since the forward force of such movement is insufficient to activate the arresting function of the inertial reel assembly 20 which would then preclude further pay out of the shoulder web strap 14 therefrom.

In response to a sudden and excessive forward (decelerative) force above a minimum design threshold, however, the inertial reel assembly 20 would activate to prevent the shoulder web strap 14 from paying out. As such, the arrested shoulder web strap 14 would then prevent the occupant of the aircraft seat AS from being forwardly propelled similar to normal operational use. However, if the deceleration force along the force vector FV was sufficiently sudden and excessively large beyond a predetermined amount (e.g., a rapid deceleration force that would occur in an aircraft crash event), the forwardly directed force would be transferred to the inertial reel assembly 20 and its associated bracket 20a which in turn would cause the shear pin bolt 13a to shear thereby separating the attachment of the forwardly projecting section 12e to the central base plate section 12c of the base mounting plate 12.

Figure 9:
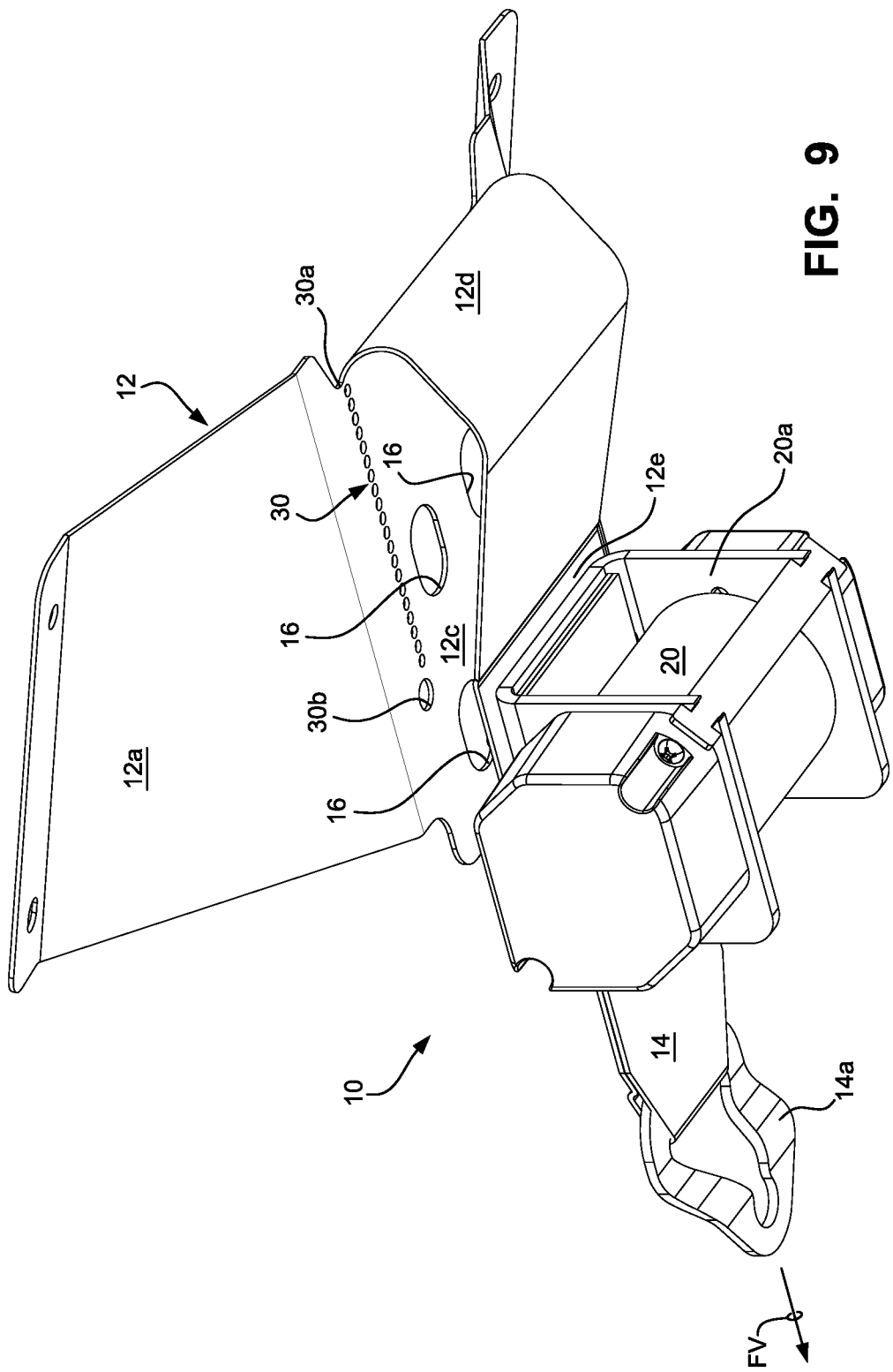

Since the forward (decelerative) force will be exerted along the force vector FV line, the physical separation of the forwardly projecting section 12e to the central base plate section 12c of the base mounting plate 12 will cause such force to pull the forwardly projecting section 12e downwardly and forwardly relative to the central base plate section 12c thereby dislocating the nuts 18b from the elongate openings 16. Such forward pulling force of the forwardly projecting section 12e will thereby responsively unbend in the direction of the force vector FV the forwardly bent section 12b serving as an initial force absorbing buffer. Such a state is depicted in FIG. 9.

Figure 10:
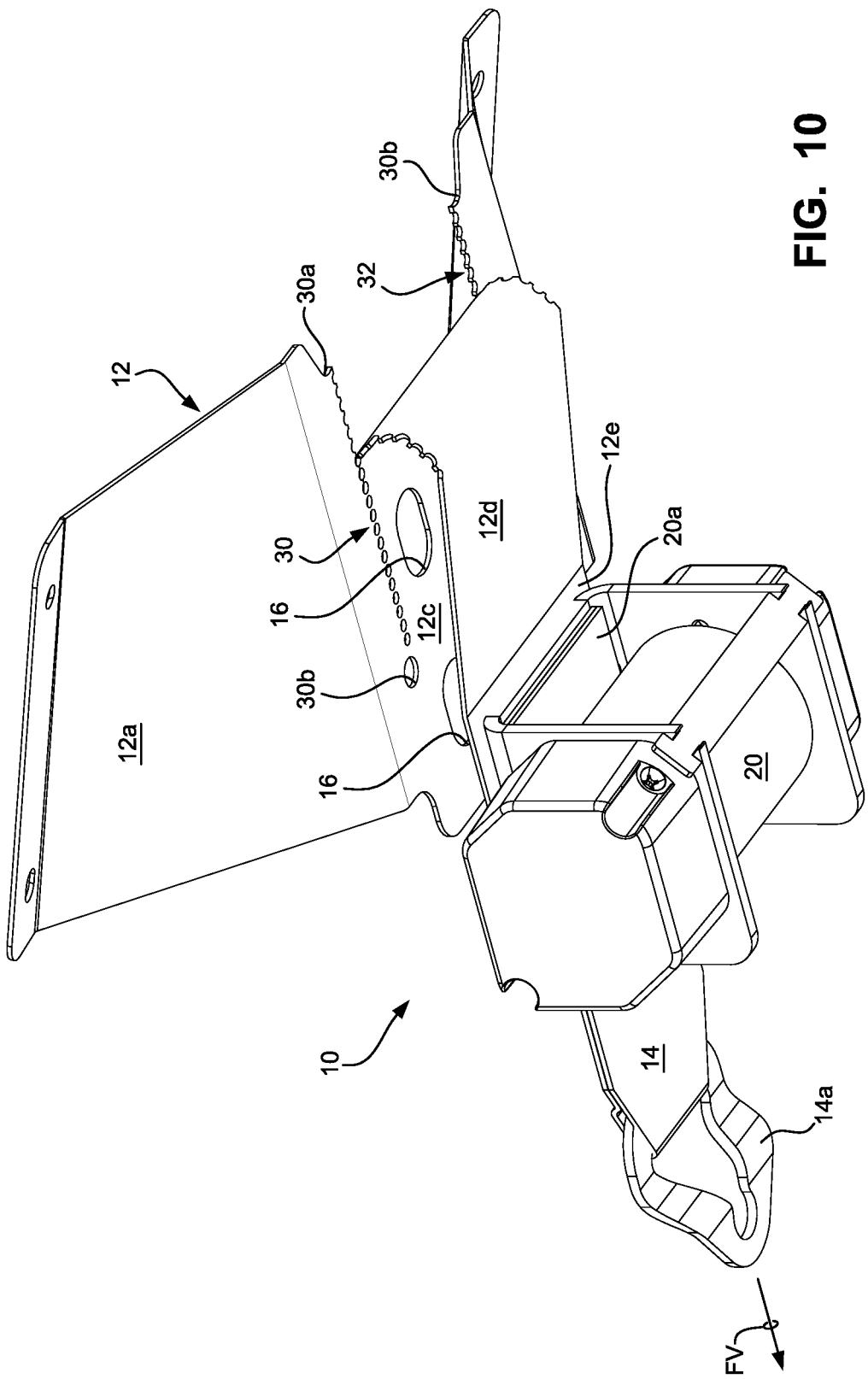

If further forward force along the force vector FV continues, it will be understood that the forwardly projecting section 12e will be completely unbent and substantially straightened and thereby substantially flattened thereby exerting the forces at the reentrant concavities 30a, 30b. The concavities 30a, 30b will therefore serve as incipient tear points for the linear pair of aligned perforations 30, 32 thereby tearing the central base plate section 12c therealong. Such a state is shown in FIG. 10. Should the force be sufficiently great as to cause the central base plate section 12c to tear completely through all of the perforations 30, 32, further forward tearing is stopped by the larger diameter forward openings 30b, 32b. In such a manner therefore, sudden and extreme deceleration forces may be absorbed by the energy absorbing shoulder belt assembly 10 which would thereby not be transmitted to the seat occupant's torso while yet ensuring that the seat occupant remained in the aircraft seat.

While reference has been made to particular embodiments of the invention, various modifications within the skill of those in the art may be envisioned. Therefore, it is to be understood that the invention is not to be limited to the disclosed embodiments, but on the contrary, is intended to cover various modifications and equivalent arrangements included within the spirit and scope thereof.

What is claimed is:

1. A force absorbing shoulder belt assembly for a vehicle seat comprising:
   a one-piece base mounting plate adapted to be attached to adjacent vehicle structure, wherein the one-piece base mounting plate includes:
   (i) a central base plate section;
   (ii) a forwardly bent section at a rear portion of the central base plate section; and
   (iii) a forwardly projecting section extending from the forwardly bent section subjacent to the central base plate section;
   an inertial reel assembly attached to the forwardly projecting section of the one-piece mounting plate, the inertial reel assembly including a shoulder web strap which in use is adapted to being positioned adjacent to a torso region of an occupant of the vehicle seat; and
   a shear pin bolt connecting a forward end of the forwardly projecting section to the central base plate section, wherein
   a deceleration force of predetermined magnitude exerted on the shoulder web strap along a force vector shears the shear pin bolt thereby separating the forwardly projecting section from the central base plate section causing the forwardly bent portion to unbend in a direction of the force vector thereby absorbing at least a portion of the deceleration force.

2. The force absorbing shoulder belt assembly according to claim 1, further comprising a pair of aligned perforations formed through the central base plate section laterally adjacent to the forwardly projecting section, wherein the central base plate section is allowed to tear along the pair of aligned perforations in response to the deceleration force of predetermined magnitude thereby absorbing an additional portion of the deceleration force.

3. The force absorbing shoulder belt assembly according to claim 2, wherein a rear edge of the central base plate section includes a pair of reentrant concavities adjacent the forwardly bent section and operatively associated with a respective one of the aligned perforations, the reentrant concavities providing incipient tear points for the aligned perforations.

4. The force absorbing shoulder belt assembly according to claim 2, wherein the central base plate section includes respective openings forwardly of the aligned perforations, the openings having a diameter larger than diameters of the aligned perforations so as to stop forward tearing of the central base plate therealong.

5. The force absorbing shoulder belt assembly according to claim 1, wherein
   the central base plate section defines a plurality of elongate apertures, and wherein
   the inertial reel assembly includes a set of bolt and nut assemblies attaching the inertial reel assembly to the forwardly projecting section such that the nut of the bolt and nut assemblies is received within a respective elongate aperture of the central base plate.

6. The force absorbing shoulder belt assembly according to claim 5, wherein
   the inertial reel assembly includes a mounting bracket, and wherein
   the set of bolt and nut assemblies attach the bracket of the inertial reel assembly to the forwardly projecting section.

7. The force absorbing shoulder belt assembly according to claim 1, wherein the forwardly bent section has a generally triangular cross-section configuration.

8. The force absorbing shoulder belt assembly according to claim 1, wherein the one-piece base mounting plate further includes inboard and outboard mounting flanges extending from the central base plate section and adapted to being attached to inboard and outboard mounting brackets associated with the vehicle.

9. An aircraft seat which comprises the force absorbing shoulder belt assembly according to claim 1.

10. A force absorbing shoulder belt assembly for a vehicle seat comprising:
    a one-piece base mounting plate adapted to be attached to adjacent vehicle structure, wherein the one-piece base mounting plate includes:
    (i) a central base plate section between the inboard and outward mounting flanges; and
    (ii) a forwardly projecting section extending from a rear portion of the central base section subjacent to the central base plate section;
    an inertial reel assembly attached to the forwardly projecting section of the one-piece mounting plate, the inertial reel assembly including a shoulder web strap which in use is adapted to being positioned adjacent to a torso region of an occupant of the vehicle seat;
    a shear pin bolt connecting a forward end of the forwardly projecting section to the central base plate section, and
    a pair of aligned perforations formed through the central base plate section laterally adjacent to the forwardly projecting section, wherein
    a deceleration force of predetermined magnitude exerted on the shoulder web strap along a force vector shears the shear pin bolt thereby separating the forwardly projecting section from the central base plate section causing the central base plate section to tear along the pair of aligned perforations thereby absorbing at least a portion of the deceleration force.

11. The force absorbing shoulder belt assembly according to claim 10, wherein a rear edge of the central base plate section includes a pair of reentrant operatively associated with a respective one of the aligned perforations, the reentrant concavities providing incipient tear points for the aligned perforations.

12. The force absorbing shoulder belt assembly according to claim 10, wherein the central base plate section includes respective openings forwardly of the aligned perforations, the openings having a diameter larger than diameters of the aligned perforations so as to stop forward tearing of the central base plate therealong.

13. The force absorbing shoulder belt assembly according to claim 10, wherein
    the central base plate section defines a plurality of elongate apertures, and wherein
    the inertial reel assembly includes a set of bolt and nut assemblies attaching the inertial reel assembly to the forwardly projecting section such that the nut of the bolt and nut assemblies is received within a respective elongate aperture of the central base plate.

14. The force absorbing shoulder belt assembly according to claim 13, wherein
    the inertial reel assembly includes a mounting bracket, and wherein the set of bolt and nut assemblies attach the bracket of the inertial reel assembly to the forwardly projecting section.

15. The force absorbing shoulder belt assembly according to claim 10, wherein the one-piece base mounting plate further includes a forwardly bent section having a predetermined geometric cross-sectional configuration joining a rear edge of the central base plate section and the forwardly projecting section.

16. The force absorbing shoulder belt assembly according to claim 15, wherein the forwardly bent section has a generally triangular cross-section configuration.

17. The force absorbing shoulder belt assembly according to claim 10, wherein the one-piece base mounting plate further includes inboard and outboard mounting flanges extending from the central base plate section and adapted to being attached to inboard and outboard mounting brackets associated with the vehicle.

18. An aircraft seat which comprises the force absorbing shoulder belt assembly according to claim 10.

* * * * *